United States Patent [19]

Hegler et al.

[11] Patent Number: 4,492,551
[45] Date of Patent: Jan. 8, 1985

[54] APPARATUS FOR THE PRODUCTION OF PLASTIC PIPES WITH TRANSVERSE GROOVES

[75] Inventors: Wilhelm Hegler, Goethestrasse 2, D-8730 Bad Kissingen; Ralph-Peter Hegler, Bad Kissingen, both of Fed. Rep. of Germany

[73] Assignee: Wilhelm Hegler, Bad Kissingen, Fed. Rep. of Germany

[21] Appl. No.: 376,737

[22] Filed: May 10, 1982

[30] Foreign Application Priority Data

May 22, 1981 [DE] Fed. Rep. of Germany ....... 3120480

[51] Int. Cl.³ .............................................. B29C 17/07
[52] U.S. Cl. .................................. 425/144; 264/40.6; 264/508; 425/233; 425/532; 425/326.1
[58] Field of Search .............. 264/508, 40.6; 425/143, 425/144, 233, 532, 326.1, 336

[56] References Cited

U.S. PATENT DOCUMENTS

| | | | |
|---|---|---|---|
| 3,473,192 | 10/1969 | Martelli | 425/532 |
| 3,776,679 | 12/1973 | Hegler | 425/532 |
| 3,919,367 | 11/1975 | Maroschak | 264/508 X |
| 3,942,929 | 3/1976 | Demets | 425/143 |
| 3,950,118 | 4/1976 | Adair | 425/144 |
| 4,072,453 | 2/1978 | Oltmanns et al. | 425/62 |
| 4,107,422 | 8/1978 | Salmon | 425/144 X |
| 4,212,618 | 7/1980 | Hegler et al. | 425/326.1 |

FOREIGN PATENT DOCUMENTS

| | | |
|---|---|---|
| 2061027 | 6/1972 | Fed. Rep. of Germany . |
| 2065048 | 6/1972 | Fed. Rep. of Germany . |
| 2537184 | 3/1977 | Fed. Rep. of Germany . |
| 2732635 | 2/1979 | Fed. Rep. of Germany . |

*Primary Examiner*—Jan H. Silbaugh
*Attorney, Agent, or Firm*—Browdy and Neimark

[57] ABSTRACT

An apparatus for the production of plastic pipes with transverse grooves comprising half shells each having a mold recess which are arranged on a machine bed driven in a cycle. The half shells are assembled in pairs in a molding path to form a complete mold, the injection head of an extruder being arranged at the beginning of the molding path. Furthermore, the half shells are provided with vacuum channels, each vacuum channel being connected to a respective mold recess. The vacuum channels are joined into vacuum connections formed in the machine bed, and the half shells are provided with cooling channels which join into cooling water inlets and outlets in the machine bed. In order to ensure an exact setting of the half shells during the molding operation, the cooling channels, on the one hand, and the vacuum channels on the other hand, in a given half shell are completely separated from each other.

2 Claims, 8 Drawing Figures

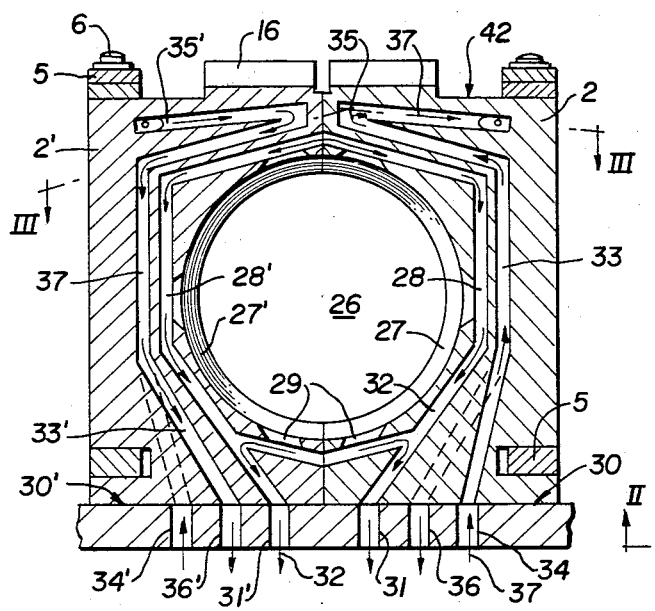
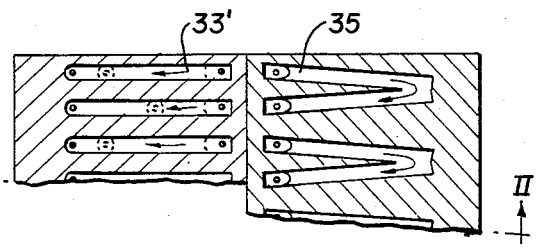
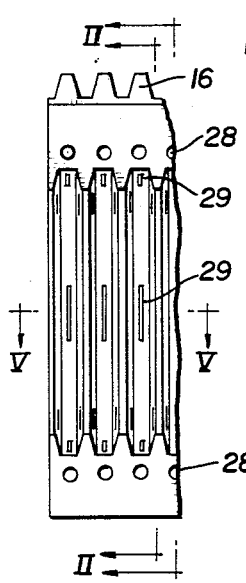
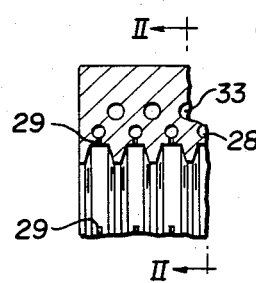
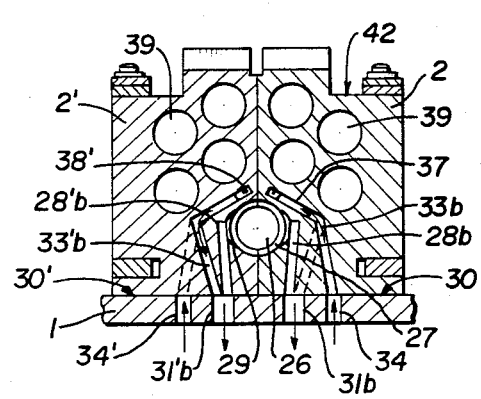

APPARATUS FOR THE PRODUCTION OF PLASTIC PIPES WITH TRANSVERSE GROOVES

FIELD OF THE INVENTION

The invention relates to an apparatus for producing plastic pipes having transverse grooves. In such apparatus, half shells each provided with a mold recess, are arranged on a machine bed and are driven in a cycle so that respective pairs complete a mold which is located on a molding path. An injection head of an extruder is located at the beginning of the molding path and the half shells are each provided with vacuum channels which communicate with each respective mold recess. The channels, in turn, communicate with vacuum connections formed in the machine bed in the molding path. Finally, the mold half shells, are, each provided with cooling channels which lead into cooling water inlets and outlets formed in the machine bed in the molding path.

BACKGROUND OF THE INVENTION

In a device of the kind known from German Offenlegungsschrift No. 20 61 027 and German Patent Specification No. 20 65 048, the cooling channels, on the one hand, and the vacuum channels, on the other hand, are connected together in each of the relevant half shells. The cooling water, while flowing through each half shell, is under a substantially reduced pressure, which even leads to partial evaporation, whereby the cooling effect is enhanced. This known arrangement has basically proved extraordinarily satisfactory; however, the problem arises that condensate gets into the mold interior through the connections between the respective mold recess and the vacuum channel, and damages the surface of the pipe which is to be manufactured, from a thermoplastic flexible tube. A further problem which has arisen is that, in order to obtain an optimally finished type of pipe, temperatures which differ widely from one another, but which must be as far as possible constant for a particular process, have to be maintained in the half shells of the mold, and these depend firstly, on the pipe diameter and the pipe wall thickness, which have been selected, and secondly, on the composition of the plastic used, such as polyethylene, polypropylene or polyvinylchloride.

An apparatus is known from German Offenlegungsschrift No. 27 32 635 for the continuous production of plastic pipe having transverse profile features, which apparatus works according to the blow molding method rather than the so-called vacuum method. In this apparatus the half shells are guided within cooled guiding channels, through which the removal of heat also takes place.

In an apparatus known from German Offenlegungsschrift No. 25 37 184 for the manufacture of the abovementioned plastic pipes, means are provided to cool the half shells, which means are attached to respective cooling water feed and outlet conduits circulating therewith.

OBJECTS AND SUMMARY OF THE INVENTION

The object of the invention is to design an apparatus of the above described type in such a way as to guarantee a precisely fixed temperature within the half shells during the molding operation.

This object is achieved according to the invention by providing the complete separation of vacuum channels and cooling channels in each of the half shells, which ensures that the flow of cooling water can be governed and controlled without being influenced by other parameters, such as the vacuum. A simultaneous achievement is the elimination of uncontrollable negative influences on the quality of the pipe to be produced. Depending on the size of the apparatus and in particular on the diameter of the pipes to be manufactured, the cooling channels may join into cooling water returns provided separately in the machine bed from the vacuum connections, said cooling water returns likewise being subjectable to vacuum, (this being adapted for the production of pipes of large diameter), or the cooling channels may join into the vacuum connections formed in the machine bed (this being adapted for the production of pipes of smaller diameter). Preferably, a temperature governing device is provided, to which at least one temperature sensor responsive to the temperature of a half shell is preconnected, and one governing valve for controlling the quantity of cooling water per unit is post-connected. The separation of vacuum channels from cooling channels in accordance with the invention has the result that automatic temperature regulation and control can be provided, since the temperature of the half shells is now governed only by the quantity of cooling water. An advantageous arrangement for determining the temperature of the half shells can be provided if the temperature sensor contacts a smooth external surface of a half shell by means of a shoe.

BRIEF DESCRIPTION OF THE DRAWINGS

Further advantages and features of the invention can be seen from the description of embodiments with reference to the drawings, in which

FIG. 2 is a vertical section through a pair of half shells of the apparatus according to the invention, taken along the lines II—II in FIGS. 3, 4 and 5;

FIG. 3 is a stepped horizontal section through the pair of half shells, taken along the line III—III in FIG. 2;

FIG. 4 is a partial interior vertical view of a half shell according to FIGS. 2 and 3;

FIG. 5 is a sectional representation of a half shell, taken along the line V—V in FIG. 4;

FIG. 6 is a vertical section through a pair of half shells of a different design, FIG. 7 is a vertical section through a further embodiment of a pair of half shells.

DETAILED DESCRIPTION OF PREFERRED EMBODIMENTS

Figure 1:
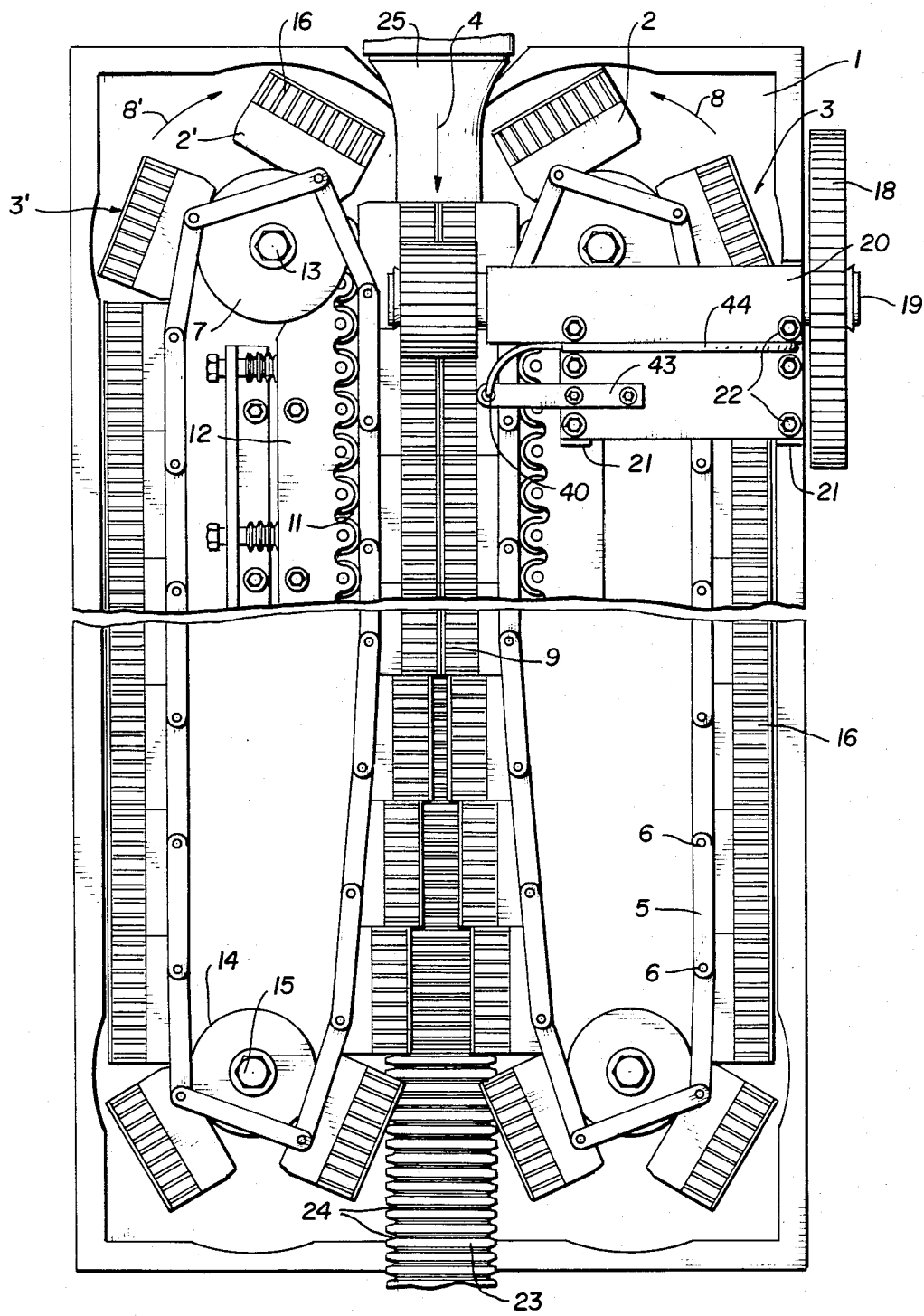
FIG. 1 is a plan view of an apparatus according to the invention.

As seen in FIG. 1, the apparatus for the production of plastics tubes with transverse grooves comprises a machine bed 1, on which half shells 2, 2' are arranged, which are joined together respectively in so-called chains 3,3'. For this purpose, a fish-plate 5 is coupled by means of a coupling bolt 6 to each half shell 2, 2' in the outer region thereof and downstream thereof with respect to the direction 4 of production, each fish-plate being attached to the succeeding half shell 2,2' at the corresponding position, likewise by means of another coupling bolt 6. The chains 3, 3' thus formed, at their rear with respect to the direction 4 of production, are carried around guide wheels which serve as and may be designated feed rollers 7. The individual half shells 2,2' are swung into a molding path 9 by the revolution of the chains 3,3' in the direction of the arrows 8,8'. In this path two half shells 2,2' at a time are united to a half shell pair, so that an unbroken succession of pairs of half shells mutually abut in the direction 4 of production. In order to achieve rapid closure of the half shells 2,2' into a parallel and adjoining orientation, so-called closing rollers 10 are provided, which bring the rear ends of the half shells 2,2', referred to the direction 4 of production, together in accelerated fashion.

In the molding path 9 itself, the mutually abutting half shells 2,2' are pressed together by means of guide rollers 11, which are rotatably mounted in guide rails 12. The feed rollers 7 are rotatably mounted on the machine bed 1 about axle bearings 13.

At the forward end of the machine bed 1, referred to the direction 4 of production, return rollers 14, likewise serving as guide wheels, are rotatably mounted on axle bearing 15, around which the chains 3,3' are guided and returned to the feed rollers 7. As can be seen in FIG. 1, the guide rails 12 with the guide rollers 11 terminate after the length of several half shells 2,2' and before the return rollers 14, so that the half shells 2,2' can be displaced away from each other transversely of the direction 4 of the production while remaining parallel to each other, before they are guided around the return rollers 14.

On the upper side of the half shells 2,2' there is provided a set of teeth 16, and the two sets of teeth 16 of the half shells 2,2' which are arranged in abutting pairs match each other, so that a common pinion 17 can engage in the teeth 16, and push the half shells 2,2' along the molding path 9 as a closed mold. This drive pinion 17 is driven in conventional manner by a motor (not shown) through a drive gear wheel 18 which is fixedly mounted on a shaft 19, the shaft in turn carrying the drive pinion 17. The shaft 19 is housed in a bearing 20, which is set apart from the machine bed by means of spacing pieces 21 and firmly fixed in relation to the machine bed by means of screws 22.

In the illustrated apparatus, plastic pipes 23 having transverse profile features, i.e. with grooves 24 extending around their girth, are produced, such as for example can be employed as protective pipes for electric cables. For this purpose an extruder is provided, of which only the injection head 25 is shown, from which a flexible tube (not seen) is extruded, and this tube enters the mold which has been formed in the molding path 9 while still in a thermally plastic condition, where the transverse profile features are formed. The apparatus thus far described is known, for example from German Offenlegungsschrift No. 20 61 027. This apparatus can produce so-called compound pipes in the same manner, which pipes are outwardly similar to the pipe 23, but are formed with a continuous smooth pipe inside in a one-piece structure.

The ordered pairs of half shells 2,2' are cooled in the molding path 9; the formation of the grooves 24 is also achieved by the application of vacuum to the mold space 26. The mold recesses 27, 27' hollowed out in the half shells 2,2' to produce a mold space 26 having a shape which is complementary to the outer shape of the pipe 23. They are provided with vacuum channels 28,28' which run close to the wall of the mold recesses 27,27' and embrace this wall at a relatively small spacing when the half shells 2,2' lie together in pairs. Numerous vacuum slits 29 from the vacuum channels 28,28' open into the mold recess 27,27'. The vacuum channels 28,28' are connected together when the half shells 2,2' lie against each other, as can be seen from FIG. 2. The vacuum channels 28,28' open to the underside 30,30' of the half shells 2,2' which (underside) lies on the machine bed 1. When the half shells 2,2' lie against each other in pairs, they communicate with vacuum connections 31,31' provided in the machine bed 1, and these vacuum connections are in turn connected to a vacuum pump, which will be further described below.

The air current in the vacuum channels 28,28' and the vacuum connections 31,31' is shown by direction arrows 32. There are further provided in the half shells 2,2' cooling channels 33,33', but the cooling channels 33,33' in the respective members of the pairs of opposed half shells 2,2' have no communication with each other. They begin likewise at the underside 30,30' of the respective half shells 2,2', where they communicate with cooling water inlets 34,34' formed in the machine bed 1, when the half shells 2,2' lie against each other. From there the cooling channels 33,33' proceed around the respective mold recesses 27,27' but spaced apart therefrom. In the embodiment shown in FIGS. 2 to 5 there are formed below the set of teeth 16 further outwardly directed supplementary cooling channels 35,35'. As can be seen most clearly in FIG. 3, cooling channels 33,33', viewed in the direction 4 of production (FIG. 1), are arranged with a relatively small mutual spacing apart. As shown in the right side of FIG. 3, two neighboring cooling channels 33,33' spaced apart in the direction 4 of production are connected together in such a way that the corresponding supplementary cooling channels 35,35' are connected together by a corresponding inclination towards each other. If a given cooling channel 33,33' is connected to the cooling water inlet 34,34', the next following cooling channel in the direction 4 of production can be connected to a cooling water return channels 36,36' formed in the machine bed 1, as can be most clearly seen from the left side of FIG. 2. The direction of flow of the cooling water is shown by the directional arrow 37.

FIG. 6 shows half shells 2,2' which are made for the production of pipes of smaller diameter, as can also be seen by a comparison with FIG. 2. The vacuum channels 28,28' with the vacuum slits 29 are identical in this case to those of the embodiment according to FIGS. 2 to 5. The cooling channels 33a,33'a are formed similarly to the embodiment of FIGS. 2 to 5, i.e. they are connected to cooling water inlets 34,34' on the underside 30,30' of the respective half shell 2,2', when the half shells lie against each other in pairs in the molding path. They do not have any supplementary cooling channels, however, but each is provided at its upper end with a through opening 38,38', by means of which two successive cooling channels 33a,33'a (in the direction 4 of production) are connected together.

The cooling water flows as shown by the direction arrows 37, and is taken off at the underside 30,30' of each respective half shell 2,2' to a vacuum connection 31a,31'a, into which correspondingly the respective cooling channel 33',33'a opens. In the half shell 2,2' itself, however, vacuum channel 28,28' on the one hand, and cooling channel 33', 33'a on the other, have no connection with each other. In this embodiment also there is achieved a good cooling of the respective half shell 2,2' in the region of the set of teeth 16.

In the embodiment of FIG. 7 the half shells 2,2' with mold recesses 27,27' are formed for the production of pipes of particularly small diameter, for example from 10 to 22 mm, In this connection, vacuum, channels 28b, 28'b are provided, each of which is connected to the corresponding mold recess 27,27' by only a single vacuum slit 29. Furthermore, cooling channels 33b,33'b are provided, which are connected together at their respective upper inner ends, once again by means of through openings 38,38'. They likewise begin at the respective underside 30,30' of the half shell 2,2', where they are subjected to cooling water from a cooling water inlet 34,34' in the machine bed 1. This water, as shown by the direction arrows 37, flows through the cooling channels 33b, 33'b, and once again exits, as in the emodiment of FIG. 6, in vacuum connections 31b, 31'b in the machine bed 1, whereby here also the vacuum channels 28b,28'b on the one hand, and the cooling channels 33b,33'b on the other hand in the respective half shells 2,2' have no connection with each other. The mold recesses 27,27' which form the mold space 26 are arranged relatively deeply in the half shells 2,2'; above are provided hollow spaces 39 which serve to save material and weight, and these are formed as bores disposed in the direction 4 of production. The reason for this arrangement is that in a given apparatus with half shells 2,2' of a given height, pipes 23 with different diameters must be produced, so that in each case there is sufficient space available in the half shells 2,2', to provide mold recesses 27,27' of different sizes.

Figure 8:
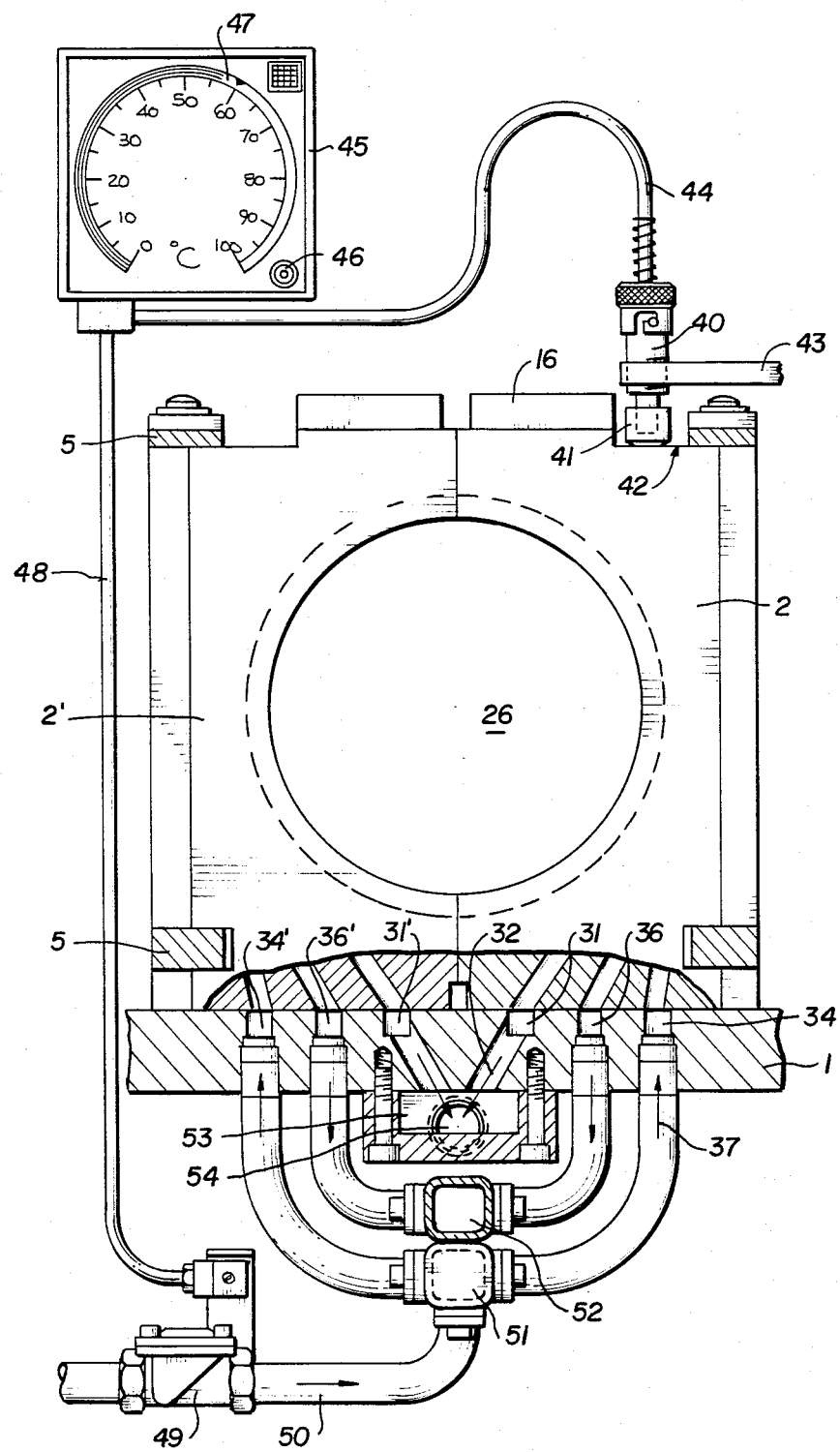
FIG. 8 is a representation of a temperature control for the half shells.

In order to permit automatic temperature regulation of the half shells 2,2' in the molding path, a temperature sensor 40 is provided as shown in FIG. 8, which lies on the flat upper side 42 of a half shell 2 near the latter's set of teeth 16, on a shoe 41, made for example from brass. Thus the temperature of the continuously travelling half shells 2 can be continually measured at this point. The temperature sensor 40 is carried by a supporting arm 43 which in turn is fixed to the bearing block 20. The temperature sensor 40 is connected by means of an electric conductor 44 to a temperature governing device 45. In this temperature governing device the target temperature can be set by means of a setting knob 46, and is made visible on a target temperature display 47. In the temperature governing device 45 there takes place a target v. actual comparison between the actual temperature as reported by the temperature sensor 40, and the set target temperature. According to the result of this target v. actual comparison, a signal is sent by a conductor 48 to a governing valve 49 constructed as a magnetic valve, said valve being arranged in a cooling water inlet conduit 50 which is connected to the cooling water inlets 34,34' in the machine bed 1 through a tube manifold 51. As can also be seen from FIG. 8, the cooling water return channels 36,36' are attached to a common vacuum conduit 52, so that the slight excess pressure of the cooling water in the cooling channels does not lead to escape of cooling water via the split between half shells 2,2' and machine bed 1.

The two vacuum connections 31,31' open into a common vacuum chamber 53, into which in turn a connection 54 of a vacuum pump also opens. In the embodiments corresponding to FIGS. 6 and 7 therefore, the cooling water also flows away into the vacuum chamber 53; there is thus no need for a special vacuum conduit 52.

We claim:
1. In apparatus for the production of plastic pipes with transverse grooves, in which half-shells each provided with a mold recess, are arranged on a machine bed and driven in a cycle so that respective pairs thereof complete a mold on a molding path, an injection head of an extruder being located at the start of the molding path, and furthermore the half-shells being each provided with vacuum channels communicating with the respective mold recess, said channels joining into vacuum connections formed in the machine bed in the molding path, and the half-shells being provided with cooling channels which join into cooling water inlets and outlets formed in the machine bed in the molding path, the improvement comprising:

said cooling channels and said vacuum channels being completely separated from each other in the respective half shells, said cooling channels joining with cooling water return channels provided separately in the machine bed from the vacuum connections, said cooling water return channels being likewise subjectable to vacuum, and means for automatically regulating the temperature of said half-shells including at least one means for sensing the temperature of a half-shell on the molding path and means for governing the quantity of cooling water per unit time flowing to said cooling water inlets, said regulating means actuating said governing means to control the quantity of flowing cooling water when said sensed temperature exceeds a predetermined temperature, the temperature of the half-shell being governed only by the quantity of flowing cooling water and maintained at a constant value during the molding operation, said temperature sensing means contacting a smooth external surface of said mold half-shell on the molding path by means of a shoe.

2. In apparatus for the production of plastic pipes with transverse grooves, in which half-shells each provided with a mold recess, are arranged on a machine bed and driven in a cycle so that respective pairs thereof complete a mold on a molding path, an injection head of an extruder being located at the start of the molding path, and furthermore the half-shells being each provided with vacuum channels communicating with the respective mold recess, said channels joining into vacuum connections formed in the machine bed in the molding path, and the half-shells being provided with cooling channels which join into cooling water inlets and outlets formed in the machine bed in the molding path, the improvement comprising:

said cooling channels and said vacuum channels being completely separated from each other in the respective half-shells, said cooling channels joining into the vacuum connections formed in the machine bed, and means for automatically regulating the temperature of said half-shells including at least one means for sensing the temperature of a half-shell on the molding path and means for governing the quantity of cooling water per unit time flowing to said cooling water inlets, said regulating means actuating said governing means to control the quantity of flowing cooling water when said sensed temperature exceeds a predetermined temperature, the temperature of the half-shells being governed only by the quantity of flowing cooling water and maintained at a constant value during the molding operation, said temperature sensing means contacting a smooth external surface of said mold half-shell on the molding path by means of a shoe.

* * * * *